United States Patent [19]

Imazaike

[11] Patent Number: 5,433,533
[45] Date of Patent: Jul. 18, 1995

[54] SHIELD PLATE FOR BEARING

[75] Inventor: Toshiyuki Imazaike, Habikino, Japan

[73] Assignee: Nichia Precision Industry Co., Ltd., Osaka, Japan

[21] Appl. No.: 169,631

[22] Filed: Dec. 20, 1993

[51] Int. Cl.⁶ .............................................. F16C 33/78
[52] U.S. Cl. .................................................... 384/488
[58] Field of Search ............... 384/488, 480, 144, 147, 384/903, 485

[56] References Cited

U.S. PATENT DOCUMENTS

| | | | |
|---|---|---|---|
| 2,251,012 | 7/1941 | Delaval-Crow | 384/488 |
| 4,183,592 | 1/1980 | Sudo et al. | |
| 4,655,617 | 4/1987 | Yasui et al. | 384/488 |

OTHER PUBLICATIONS

Japanese Laid Open Application Hei 5-58955 (Jan. 1992).

*Primary Examiner*—Lenard A. Footland
*Attorney, Agent, or Firm*—Griffin, Butler, Whisenhunt & Kurtossy

[57] ABSTRACT

In a bearing having inner and outer rings concentrically disposed about a bearing axis, the outer ring is provided with an annular mounting groove in an inner surface facing the axis for receiving a shield plate. The shield plate is an annular disk-like plate having a central opening for receiving the inner ring as the shield plate is mounted between the rings. The shield plate has an annular generally V-shaped groove in a surface facing in the axial direction, the groove being bounded on the outer circumferential side by a first portion of the plate having a nearly triangular shape, and bounded on the inner circumferential side by a second portion of the plate. The first portion of the plate has a thickness in the radial direction which is ½ to ¼ the thickness of the second portion, and a height in the axial direction which is ¼ to ⅓ the thickness of the second portion. Variations in the depth of the mounting groove occurring during formation of the outer ring are absorbed by variations in the deformation of the first portion of the shield plate so that the shield plate lies normal to the bearing axis and the outer ring is not deformed.

4 Claims, 5 Drawing Sheets

SHIELD PLATE FOR BEARING

FIELD OF THE INVENTION

The present invention relates to shield plates for bearings, and more particularly to plastic shield plates for small bearings having an outside diameter of from 3.0 mm to 40 mm.

BACKGROUND OF THE INVENTION

FIG. 5 shows a plastic shield plate for a bearing as disclosed in Japanese Laid-Open Utility Model 5-58955. Referring to FIG. 5, the shield plate E is disk-shaped and has a center opening $E_5$ through which a shaft D and a bearing inner ring A extend. The plate E has a deep circular groove $E_2$ formed in the surface of the plate extending outwardly from the bearing in the direction of the axis of the shaft. The outer side of groove $E_2$ is bounded by a mounting part $E_1$ which is received into a mounting groove $B_1$ of the bearing outer ring B. The mounting part $E_1$ has a flat surface $E_{1a}$ which abuts a horizontal surface $B_{1a}$ of mounting groove $B_1$ when the shield plate is fitted into the mounting groove.

The shield plate is mounted on the bearing by placing the plate over the bearing (as viewed in FIG. 5) and pressing it downwardly. The plate flexes in the region $E_3$ as the mounting part $E_1$ is pressed against that portion of the outer ring bounding the upper portion of the mounting groove $B_1$. If sufficient force is applied, the mounting part $E_1$ snaps into the mounting groove.

Once the shield plate is in place, it is held by engagement of a flat surface $E_{1b}$ on the mounting part with a flat surface $B_{1b}$ bounding the mounting groove. To hold the shield firmly in place, the thin portion $E_3$ of the plate, which flexes during installation, must be relatively stiff. However, if the portion $E_3$ is too stiff then the outer ring is deformed as the shield plate is pressed into position.

High precision is required during the manufacturing of shield plate E and formation of the mounting groove $B_1$. However, variations in dimensions may occur if, for example, there is a flaw in the cutting machine which forms the mounting groove $B_1$ or the cutting machine is not accurately adjusted. The mounting part $E_1$ is a stiff lump and lacks elasticity hence any dimensional variations in the groove $B_1$ occurring during manufacture cannot be absorbed by the mounting part. If the mounting groove is too large, the shield plate may move loosely in the groove. On the other hand, if the mounting groove is too small, the outer ring may be deformed as the shield plate is pressed into position, and the main part $E_4$ of the shield plate may be flexed so that it does not lie in a linear state normal to the axis of the shaft B but is instead inclined relative to the shaft.

If, to absorb any dimensional variations during manufacture, a soft synthetic resin material is used, the shield plate exerts less pressure against the surface of the mounting groove $B_1$ so the shield plate may be detached by a slight external force.

SUMMARY OF THE INVENTION

An object of the present invention is to provide a plastic bearing shield which readily adapts to dimensional variations during manufacture of the bearing.

A further object of the invention is to provide a plastic bearing shield which will not deform the outer bearing ring of a bearing as the shield plate is mounted therein.

Another object of the invention is to provide shield plates which may be firmly fixed in mounting grooves in the outer rings of bearings so as to lie in planes normal to the axes of the bearings despite dimensional variations in the mounting grooves.

Still another object of the invention is to provide a bearing shield plate which may be firmly fixed in a mounting groove in the outer ring of a bearing so that it is not easily detached or deformed by an external force.

Other objects and advantages of the invention will become obvious upon consideration of the following description and the accompanying drawings.

DESCRIPTION OF PREFERRED EMBODIMENTS

Figure 1:
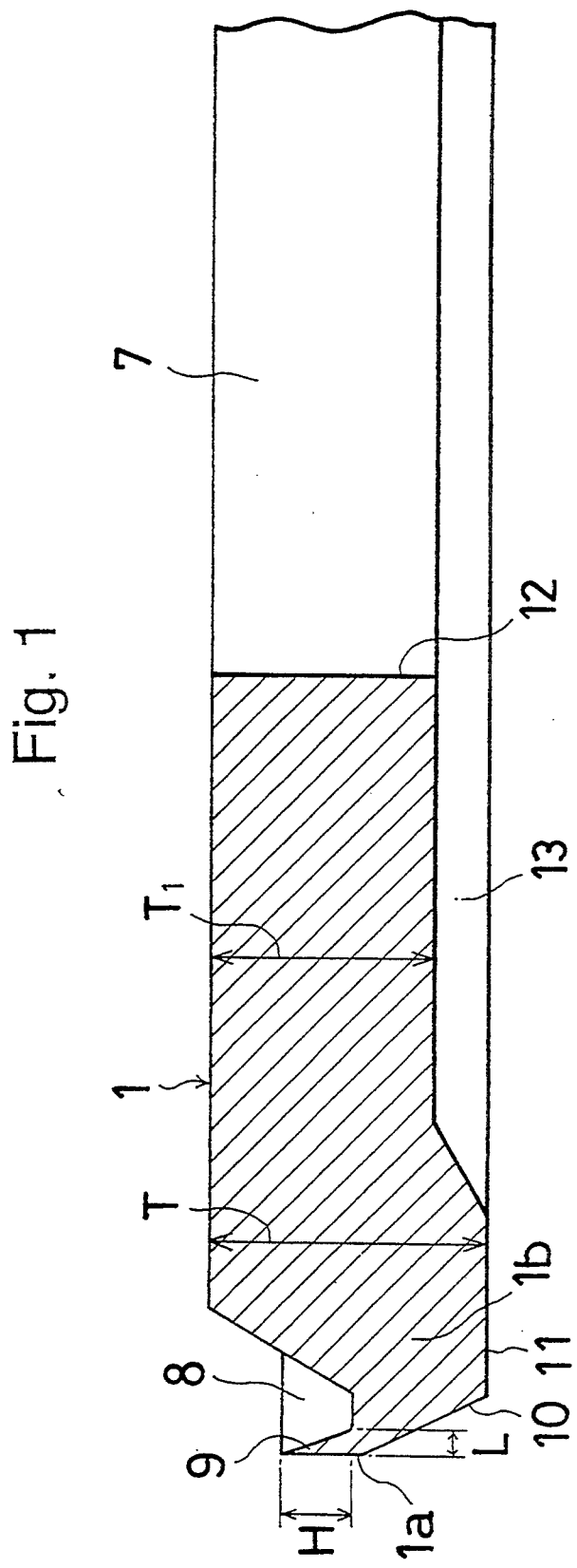
FIG. 1 is a longitudinal sectional view, on an enlarged scale, of one half of a plastic shield for a bearing according to a first embodiment of the invention.
Figure 2:
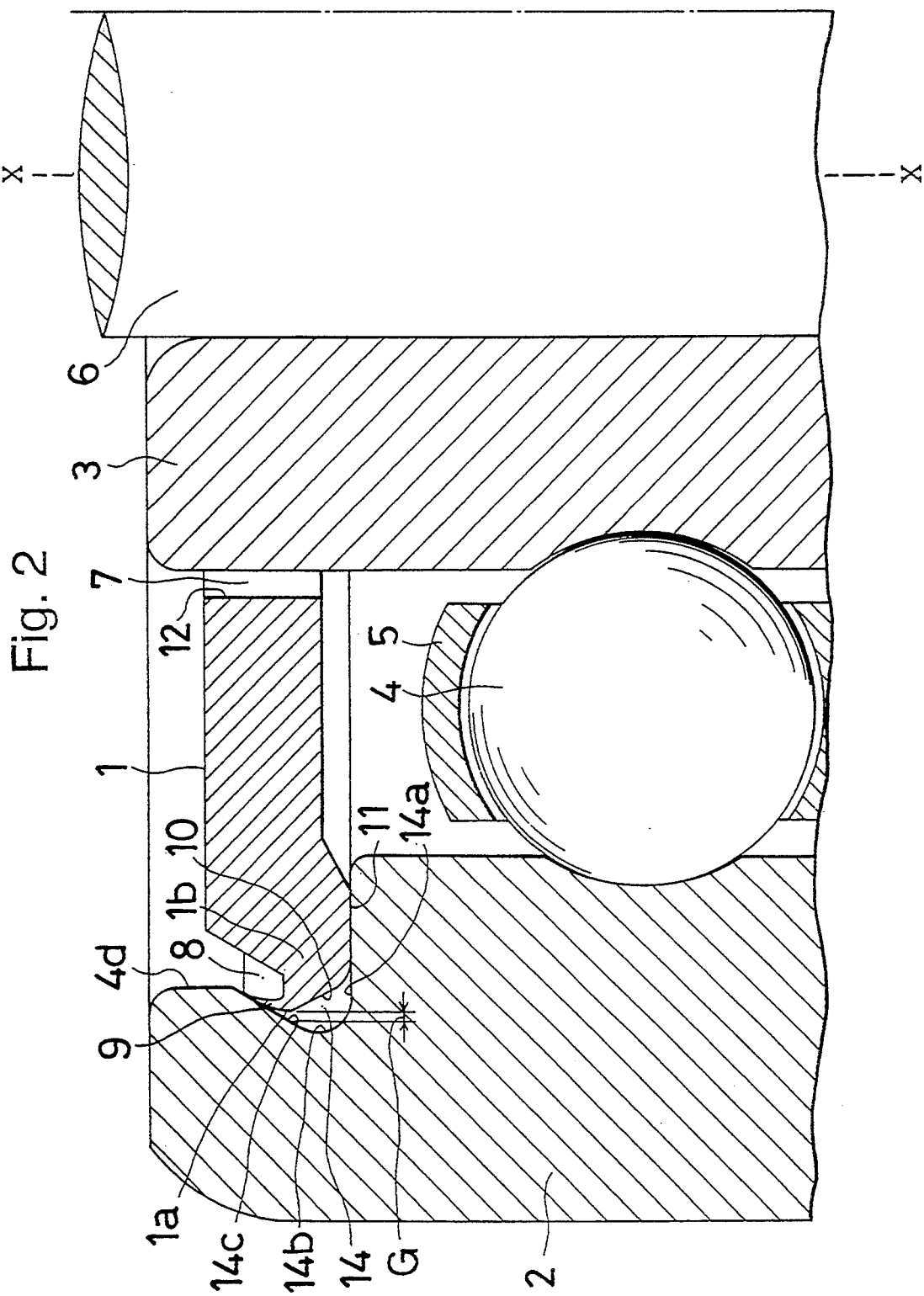
FIG. 2 is a longitudinal sectional view, on an enlarged scale, of a bearing and a first embodiment of the bearing shield plate.

Referring to FIGS. 1 and 2, a plastic shield plate 1 is provided for a bearing comprising an outer ring or race 2, an inner ring 3, a ball 4 and a ball retainer 5. The bearing is shown in FIG. 2 as being mounted on a shaft 6 having an axis X which is also the axis of the inner and outer rings of the bearing.

The shield plate 1 is an annular disk-like plate having a central opening 7 for receiving the inner ring 3 as the shield plate is mounted between the inner and outer rings. An annular generally V-shaped groove is formed in the surface of the shield plate that faces outwardly of the bearing in the direction of axis X. The groove 8 is bounded on its outer circumferential side by a first portion 9 of the shield plate and is bounded on its inner circumferential side by a second portion 1b of the shield plate, the second portion having a thickness T in the axial direction.

The first portion 9 of the shield plate comprises the outer periphery of the shield plate. It is ring-shaped and has a nearly triangular shape when seen in cross-section. The first portion 9 is shown in FIG. 1 as having the shape of a right triangle when seen in cross-section but it may also be shaped as an isosceles triangle. The first portion 9 has a height H in the axial direction of ½ to 1/5 and preferably about ¼ the thickness T of the second portion 1b. The first portion has a maximum thickness L in the radial direction of 1/12 to 1/16 and preferably about 1/10 the thickness T of the second portion 1b. The V-shaped groove 8 has a depth of about ½ the thickness T of the second portion 1b of the shield plate. That is, the bottom of groove 8 is opposite the mid-point of the thickness T. Since the first portion 9 of the shield plate forms one wall of groove 8, the base or widest part L of the first portion 9 is also located opposite the mid-point of the thickness T.

The second portion 1b of the shield plate has a flat surface 11 which faces in the axial direction and inwardly toward the outer ring 2. The second portion 1b has a further sloping surface 10 which extends from surface 12 toward the triangular first portion 9 of the shield plate.

A third portion of the shield plate 1 extends radially inwardly from the second portion 1b to the central opening 7. The peripheral surface 12 forming the bounding wall of opening 7 extends axially and is linear when viewed in section. The third portion of the shield plate 1 extends over a region opposite ball 4 and cage 5, and the side of the third portion facing the ball and cage is provided with a recess 13. Therefore, the thickness $T_1$ of the third portion of the shield plate is somewhat less than the thickness T of the second portion.

The shield plate 1 is integrally formed by injection forming of a synthetic resin such as polyamide alloy resin, possessing appropriate stiffness and elasticity. Although an amide alloy is preferred, other synthetic resins may be used, such as the so-called engineering plastics and the synthetic resin material enhanced in chemical or heat resistance by polymer alloying.

The dimensions of the shield plate 1 may vary depending on the size of the bearing on which it will be used. The shield plate is intended for use on small bearings having an outside diameter ranging from 30 mm to 40 mm. The shield plate 1, shown in FIG. 1 on an enlarged scale, has a thickness $T_1$ of about 0.23 mm and a radius of about 2.5 mm and may be used on a bearing having an outer diameter of 7.0 mm.

As shown in FIG. 2, the shield plate 1 is mounted on the bearing in a generally V-shaped mounting groove 14 formed in an inner surface of outer ring 2 facing the axis X. The mounting groove 14 is bounded by a flat surface 14a lying in a plane normal to the axis X, a curved sloping surface 14b, and a sloping surface 14c which joins an inner surface of the outer ring that extends in the axial direction.

The shield plate 1 is mounted on the bearing by positioning the shield plate so that the inner ring 3 is inserted into the central opening 7. The shield plate is then pressed so that the first portion 9 is elastically deformed as it is pressed against sloping surface 14c of mounting groove 14 and the flat surface 11 of the shield plate abuts the flat surface 14a of the mounting groove. When the shield plate is completely in place, the first portion 9 of the shield plate is still elastically deformed so that the shield plate is tightly fixed against surface 14a and 14c of the mounting groove as shown in FIG. 2.

When the shield plate is firmly fixed in position, there is a gap G between the outermost edge 1a of the shield plate and the sloping surface 14c of the mounting groove. Without gap G, the second or thick portion 1b would press radially outwardly against the surface 14c thereby causing deformation.

Figure 3:
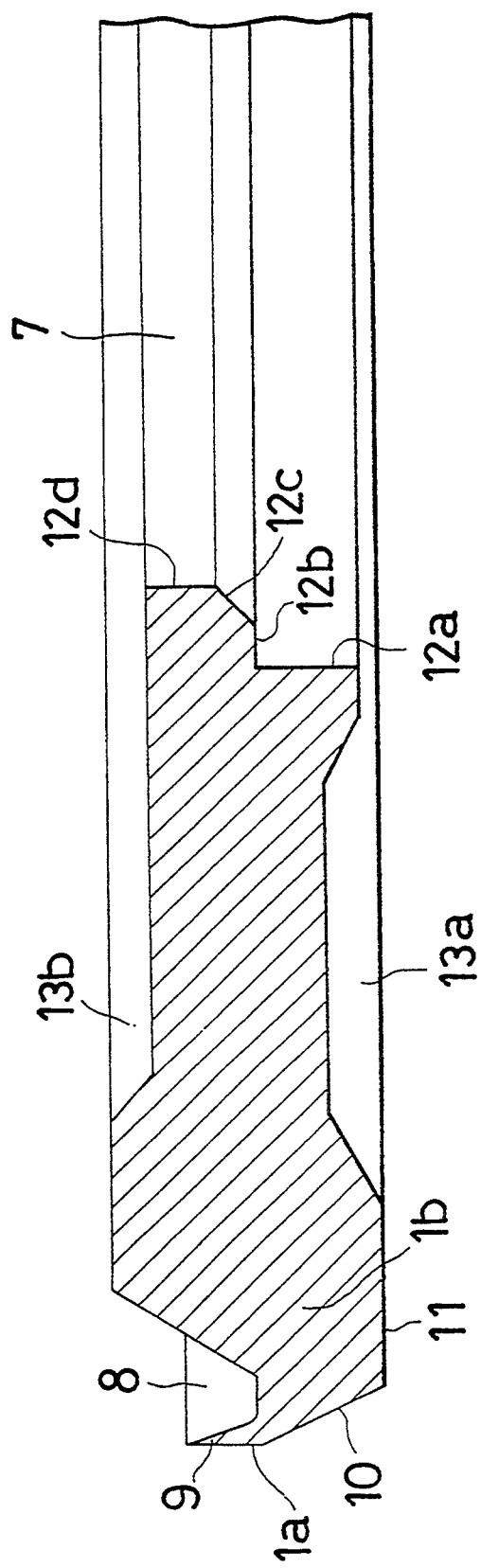
FIG. 3 is a view, similar to FIG. 1, of a second embodiment of the invention.
Figure 4:
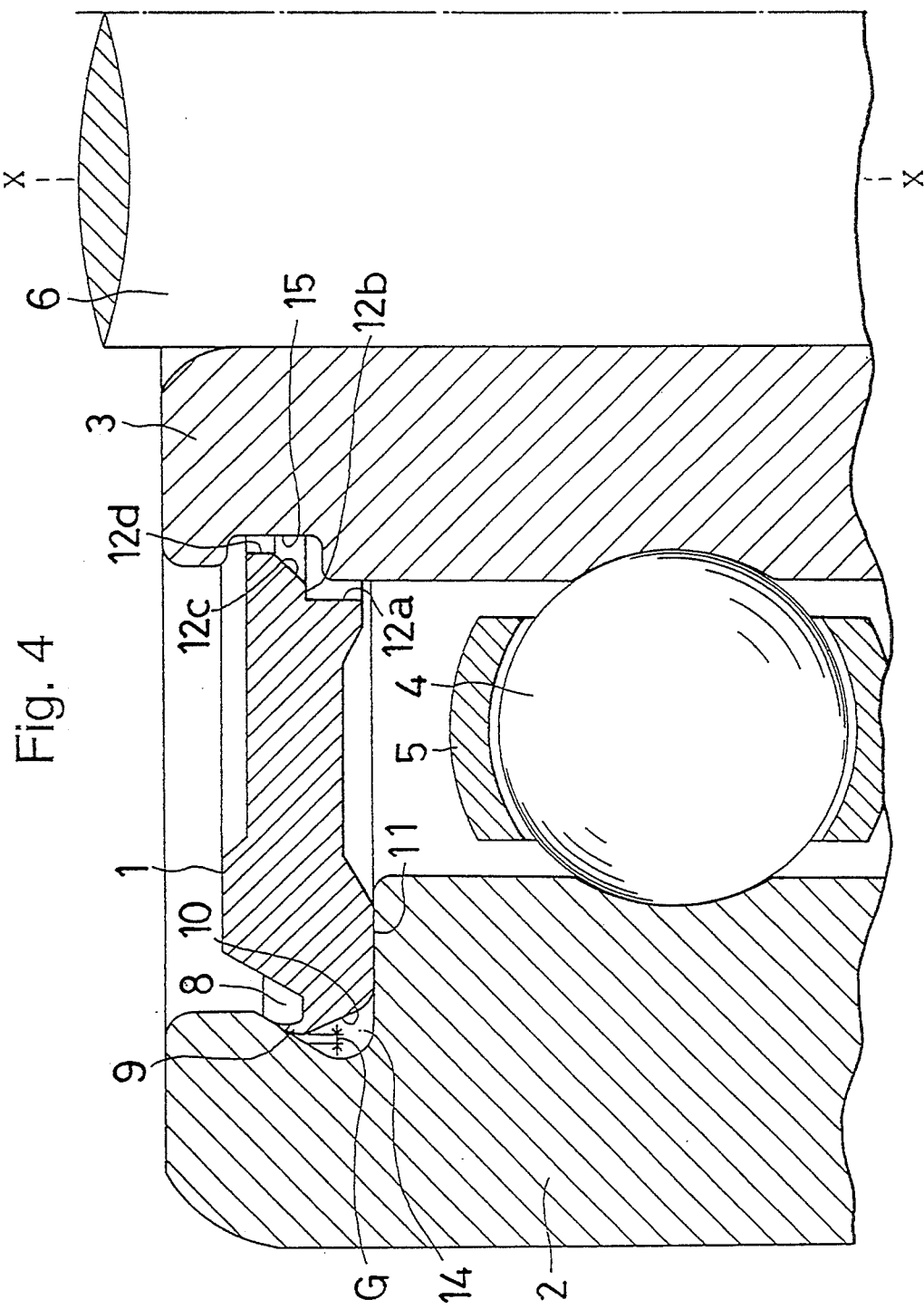
FIG. 4 is a view, similar to FIG. 2, showing a portion of a bearing having thereon a plastic shield plate according to the second embodiment of the invention; and, FIG. 5 is a sectional view of a prior art bearing having a plastic bearing shield.
Figure 5:
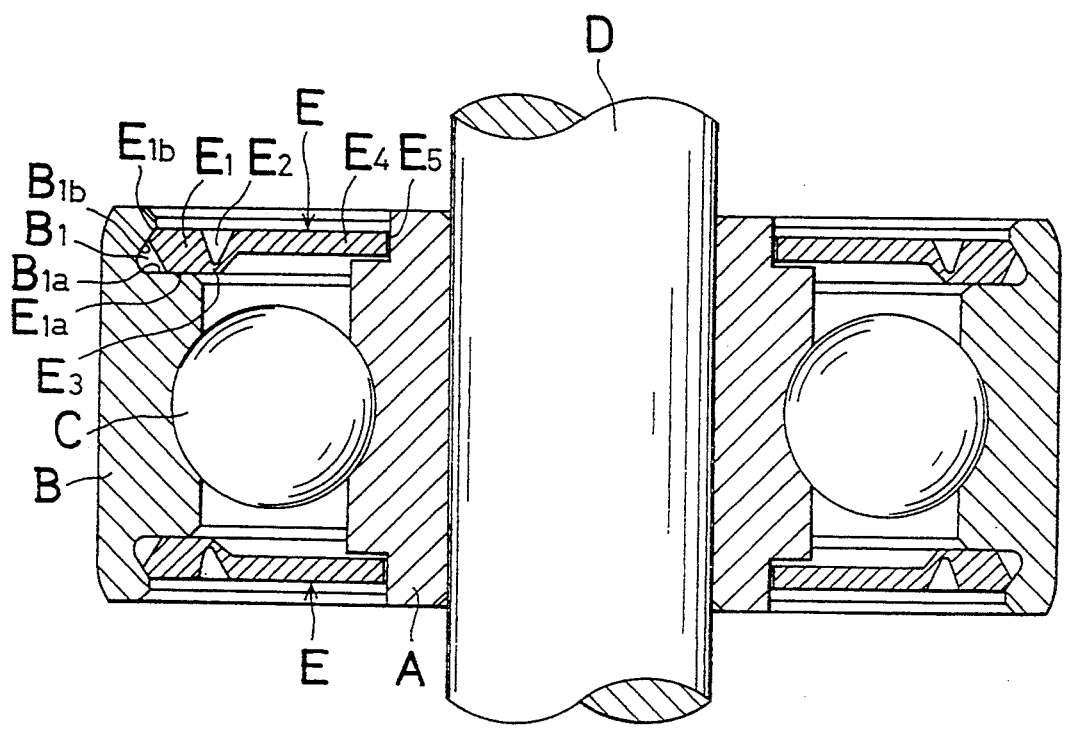

FIGS. 3 and 4 illustrate a second embodiment of the invention wherein the surface of the shield plate bounding the central opening 7 comprises a first cylindrical surface 12a, and a second cylindrical surface 12d having a smaller diameter, the cylindrical surfaces both extending in the direction of axis X. The cylindrical surfaces are joined by a third annular surface 12b lying in a plane normal to axis X and a fourth surface 12d which lies at an angle with respect to the first, second and third surfaces. A recess 13b is provided in the surface of the shield plate that faces outwardly of the bearing in the axial direction. In addition, an annular recess 13a is provided in the surface of the shield plate that faces inwardly of the bearing in the axial direction.

The outer circumference of the inner ring 3 is provided with an annular recess 15 for receiving the projecting portion of the shield plate bounded by surfaces 12b, 12c, 12b and the surface of recess 13b. This arrangement enhances the sealing performance of the shield plate between the inner ring 3 and the radially inward peripheral surface of the shield plate.

From the foregoing description it is seen that the present invention provides a shield plate having a ring-shaped outer peripheral projection having a triangular section and thin wall thickness, the projection elastically abutting a sloping surface of a mounting groove provided in an outer ring of a bearing, and resting against a surface of the mounting groove extending normal to the bearing axis. Therefore, as the shield plate is mounted in the mounting groove the thin walled projection easily elastically deforms so that a minimum radial force is applied to the outer ring, thereby avoiding deformation of the outer ring. If, during manufacture, the mounting groove is not formed to precise dimensions, any variation in the dimensions is absorbed or offset by deformation of the projection rather than deformation of the thick portion hence the shield plate will still lie in a plane normal to the bearing axis. Furthermore the provision of a gap between the thick portion of the shield plate and the mounting groove insures that the thick portion of the shield plate will not press against the outer ring in the radial direction to deform the outer ring in the event the shield plate expands as a result of absorption of water or high temperatures during use.

Although preferred embodiments of the invention have been described in detail by way of illustration, it will be understood that various modifications and substitutions may be made in the described embodiments without departing from the spirit and scope of the invention as defined by the appended claims.

I claim:

1. A plastic bearing shield plate for a bearing having inner and outer rings disposed about a bearing axis, the outer ring having an annular mounting groove in an inner surface facing the bearing axis, said plastic shield plate comprising:
    an annular disk-like plate having a central opening for receiving the inner ring of a bearing as the shield plate is mounted between the inner and outer rings,
    an annular generally V-shaped groove in a surface of said plate facing outwardly of said bearing in the axial direction,
    said generally V-shaped groove being bounded on an outer circumferential side by a first portion of said plate comprising the outer periphery of the plate and having a shape that is nearly triangular in cross-section,
    said generally V-shaped groove being bounded on an inner circumferential side by a second portion of said plate, said second portion having a flat planar surface engaging a surface of said mounting groove,
    said second portion having a sloping peripheral surface which extends from the surface engaging the mounting groove to said first portion,
    said shield plate having a radius of from 1.2 to 15 mm, said second portion having a thickness of from 0.2 to 0.6 mm in the direction of said axis, and, said first portion having a maximum thickness, in the direction of said radius, which is 1/12 th to 1/6 th the thickness of said second portion, and a height in the axial direction which is ½ to 1/5 the thickness of said second portion whereby said generally V-shaped groove has a depth which is ½ to 1/5 the thickness of said second portion.

2. A plastic bearing shield as claimed in claim 1 wherein said bearing shield has an inner peripheral surface extending in the direction of said axis and bounding said central opening.

3. A plastic bearing shield as claimed in claim 1 wherein said bearing shield has an inner periphery bounding said central opening and comprising first and second cylindrical surfaces of different diameters and extending parallel to said axis, and third and fourth surfaces joining the first and second cylindrical surfaces, said third surface extending normal to said axis and said fourth surface lying at an angle with respect to the first, second and third surfaces.

4. A plastic bearing shield plate as claimed in claim 1 for use in a bearing wherein said mounting groove comprises a first groove surface extending normal to said axis, an arcuate groove surface joining the first groove surface, and a further surface joining the arcuate groove surface and sloping relative to said axis, said first portion of triangular section having a base disposed in a plane approximately bisecting the thickness of said second portion and having an outer peripheral surface extending from said base and parallel to said axis, said outer peripheral surface having a height that is ½ the thickness of said second portion.

* * * * *